US012588123B2

(12) United States Patent
Mosalam et al.

(10) Patent No.: US 12,588,123 B2
(45) Date of Patent: Mar. 24, 2026

(54) CYBER-PHYSICAL SYSTEM FOR REAL-TIME DAYLIGHT EVALUATION

(71) Applicant: The Regents of the University of California, Oakland, CA (US)

(72) Inventors: Khalid Mosalam, Oakland, CA (US); Jiawei Chen, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 40 days.

(21) Appl. No.: 18/708,936

(22) PCT Filed: Nov. 10, 2022

(86) PCT No.: PCT/US2022/049521
§ 371 (c)(1),
(2) Date: May 9, 2024

(87) PCT Pub. No.: WO2023/086457
PCT Pub. Date: May 19, 2023

(65) Prior Publication Data
US 2025/0008625 A1 Jan. 2, 2025

Related U.S. Application Data

(60) Provisional application No. 63/278,426, filed on Nov. 11, 2021.

(51) Int. Cl.
*H05B 47/11* (2020.01)
*G01J 1/42* (2006.01)
*H02S 20/32* (2014.01)

(52) U.S. Cl.
CPC ............ *H05B 47/11* (2020.01); *G01J 1/4204* (2013.01); *H02S 20/32* (2014.12); *G01J 2001/4266* (2013.01)

(58) Field of Classification Search
CPC ........ H05B 47/11; H02S 20/32; G01J 1/4204; G01J 2001/4247; G01J 2001/4266
See application file for complete search history.

(56) References Cited

U.S. PATENT DOCUMENTS

| | | |
|---|---|---|
| 2009/0278479 A1 | 11/2009 | Platner et al. |
| 2014/0225512 A1 | 8/2014 | Birru et al. |
| 2018/0152134 A1 | 5/2018 | Arliaud et al. |
| 2021/0000020 A1 | 1/2021 | Nicole et al. |
| 2024/0240983 A1* | 7/2024 | Van Den Bos ....... G01J 1/0437 |

* cited by examiner

*Primary Examiner* — Kevin K Pyo
(74) *Attorney, Agent, or Firm* — Venable LLP; Ryan T. Ward

(57) ABSTRACT

A system for determining light conditions in a space of interest and to control a device thereon includes a light sensor arranged to detect light entering a sub-volume of the space of interest to provide measurement data corresponding to at least an intensity and direction distribution of light entering the sub-volume: a data processor configured to communicate with the light sensor to receive the measurement data, the data processor configured with a computational model to provide a calculated distribution of light based on the measurement date from the sub-volume of the space of interest; and a control system configured to communicate with the data processor to receive the calculated distribution of light and provide control signals based on the calculated distribution of light.

3 Claims, 7 Drawing Sheets

CYBER-PHYSICAL SYSTEM FOR REAL-TIME DAYLIGHT EVALUATION

CROSS REFERENCE TO RELATED APPLICATIONS

The present patent application is a U.S. National Stage of PCT/US2022/049521, filed Nov. 10, 2022, which claims priority benefit to U.S. Provisional Patent Application No. 63/278,426, filed on Nov. 11, 2021, the entire contents of which are incorporated herein by reference.

BACKGROUND

1. Technical Field

The currently claimed embodiments of the present invention relate to daylight sensing technologies, and more specifically to systems and methods for evaluating daylight distribution in buildings and other built facilities (here collectively referred to as structures) for optimal lighting control.

2. Discussion of Related Art

In developed countries, a large percentage of the generated primary energy is consumed by structures, mostly buildings. This has led to an urgent need for creating efficient buildings for the purpose of reducing energy consumption. In office buildings, lighting takes up 20%-45% of the total energy consumption. At the same time, the adoption of smart lighting control strategies such as daylight harvesting is shown to reduce the lighting energy use by 30% to 50%.

For most of the closed-loop lighting control systems, the real-time data of the daylight level at the area of interest (e.g., the workbench in an office) is the most important input. Current state-of-the-art solutions use dense arrays of lux-meters (photosensors) to monitor the daylight environment inside the structures. The luxmeters are either placed on the workbenches or on the ceilings or walls near the working area. Digital cameras are used in controlled laboratory environments and occasionally in common buildings to evaluate glare resulting from excessive daylight. The disadvantage of these sensor-based approaches is that they are expensive to install and commission. At the same time, the sample area of these sensors is limited to either the area of the luxmeters or the view of the cameras. As a result, many sensors are needed to measure the daylight in a large office space. There thus remains a need for improved daylight sensing systems and methods.

SUMMARY OF THE DISCLOSURE

An aspect of the present invention is to provide a system for determining light conditions in a space of interest and to control a device based thereon. The system includes a light sensor configured to be arranged to detect light entering a sub-volume of the space of interest to provide measurement data corresponding to at least an intensity and direction distribution of light entering the sub-volume; and a data processor configured to communicate with the light sensor to receive the measurement data, the data processor being configured with a computational model to provide a calculated distribution of light over the space of interest based on the measurement data from the sub-volume of the space of interest. The system also includes a control system configured to communicate with the data processor to receive the calculated distribution of light and configured to provide control signals based on the calculated distribution of light for the device to be controlled.

In an embodiment, the space of interest is a room in a building and the subspace is proximate a portion of a window that allows daylight to pass therethrough into the room, and the device to be controlled is a room light.

In an embodiment, the space of interest is a space that includes at least one solar panel attached to a movable mechanism to orient the at least one solar panel to the sun, and the device is the movable mechanism attached to the at least one solar panel.

In an embodiment, the space of interest is an interior space of a greenhouse, and the device is at least one of a data display device, an illumination device, a fan, an adjustable vent, or a watering device.

In an embodiment, the luminous-distribution sensor includes (a) a front panel defining an aperture therethrough: (b) an optical core having a concave surface and arranged behind the front panel so that light that passes through the aperture would impinge upon the concave surface; and (c) a plurality of light-sensing elements distributed across the concave surface. The plurality of light-sensing elements provide intensity and direction of light along a corresponding plurality of light-ray paths to provide a measured luminous distribution.

In an embodiment, the concave surface is a semi-spherical surface. In an embodiment, the plurality of light-sensing elements are arranged in a pattern across the concave surface corresponding to a Klems basis.

Another aspect of the present invention is to provide a luminous-distribution sensor. The sensor includes a front panel defining an aperture therethrough; an optical core having a concave surface and arranged behind the front panel so that light that passes through the aperture would impinge upon the concave surface; and a plurality of light-sensing elements distributed across the concave surface. The plurality of light-sensing elements provide intensity and direction of light along a corresponding plurality of light-ray paths to provide a measured luminous distribution.

In an embodiment, the concave surface is a semi-spherical surface. In an embodiment, the plurality of light-sensing elements are arranged in a pattern across the concave surface corresponding to a Klems basis.

Yet another aspect of the present invention is to provide a method for determining light conditions in a space of interest and for controlling a device based thereon. The method includes detecting light entering a sub-volume of the space of interest to provide measurement data corresponding to at least an intensity and direction distribution of light entering the sub-volume; receiving the measurement data by a data processor that is configured with a computational model: calculating, using the computational model on the data processor, a distribution of light over the space of interest based on the measurement data from the sub-volume of the space of interest; and controlling, using the calculated distribution of light, the device.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
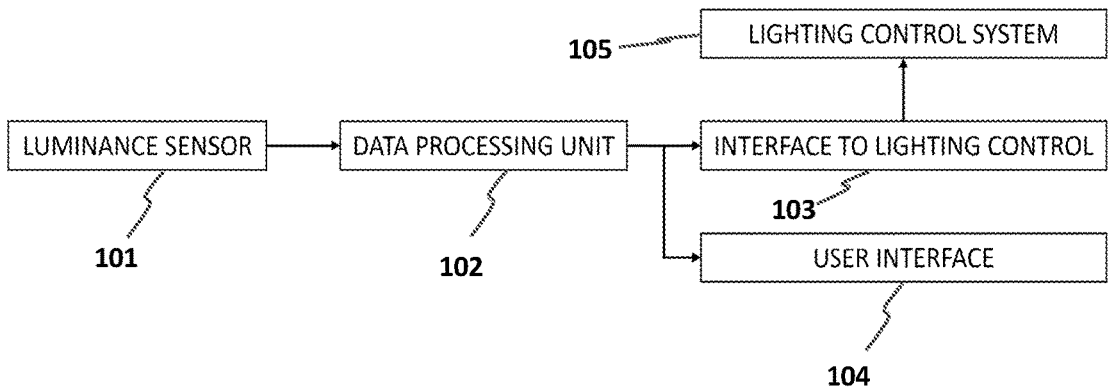
FIG. 1 shows a block diagram of a portable cyber-physical system for real-time daylight evaluation in buildings, according to an embodiment of the present invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed without departing from the broad concepts of the present invention. All references cited anywhere in this specification are incorporated by reference as if each had been individually incorporated.

An embodiment of the current invention relates to evaluating the daylight distribution inside structures in two steps. First, the luminance sensor samples the luminance distribution from the glazing units and the light tubes. Second, the daylight distribution is calculated in real time with the measured data as the input light sources in the structure.

The parallel luminance sensor comprises two main components. One component is a front panel with an aperture hole as the sample port. The other component is a hemispherical core with multiple light sensor chip slots arranged in specific pattern, e.g., the Klems basis widely adopted in the analysis of glazing units. The center of the aperture coincides with the center of the hemisphere when the two components are assembled. Multiple ambient light sensor chips are inserted in the slots of the hemispherical core. The slots are arranged such that each light sensor chip faces the center of the aperture hole. The readings of each light sensor chip are converted to the average luminance within the solid angle patches corresponding to the Klems basis. In this way, the luminance distribution emitted from the location of the aperture hole is measured in the form of the discrete Klems basis. Therefore, when the luminance sensor is installed behind the glazing units, the daylight passing through the glazing units can be recorded as the input into the structure interior.

The simulation, according to an embodiment of the present invention, is performed in two stages, i.e., the commissioning stage and the online stage. In the commissioning stage, the illuminance contribution of a unit-luminance beam emitted from the glazing unit in the direction of each of the Klems basis is calculated with a raytracing algorithm. The result is a view matrix, which maps the luminance in each Klems basis to the light distribution inside the structure. During the online stage, the luminance data vector measured by the luminance sensor is multiplied with the precomputed view matrix to obtain the light contribution from the daylight passing through the glazing unit where the luminance sensor is located. Because the calculation only involves matrix multiplications and vector additions, it is performed in real time with small computation power.

The disclosed and/or claimed subject matter is not limited by this summary. Additional aspects by the following description and associated drawings are also presented.

Accordingly, some embodiments of the current invention provide real-time daylight evaluation in a large area with very few sensors deployed near the glazing units of the structures.

Further embodiments can provide a design of a portable cyber-physical system for daylight evaluation in buildings, agriculture facilities and solar farms (here collectively referred to as structures) in real time. In some embodiments, the system can include novel parallel luminance sensors to measure the light emitted from the glazing units of a structure, and a digital model to simulate the indoor light distribution inside the structure space based on the luminance data measured by the sensors. When in operation, the luminance sensors measure the daylight luminance entering the structure through the glazing units in real time, and the data processing unit calculates the daylight distribution with the luminance data and the precalculated illuminance contributions of each glazing unit. There are four main advantages of the novel cyber-physical system of this embodiment compared with the prevalent luxmeter photosensor-based daylight evaluation method. The first is that this system does not require sensors to be installed throughout the structure space, thus reducing installation and commissioning costs. The second is that the high-definition luminance data the sensor captures enables evaluation of the daylight distribution in the whole structure area, rather than at the spots where the traditional sensors are installed. The third is that without the need to attach luxmeters on the workbench area, it is less intrusive for the occupants. Finally, this system can be deployed and redeployed easily because of its small form factor and the ease of conducting simulations instead of recommissioning.

A good indoor lighting environment is crucial to the wellbeing and the performance of the occupants. An office environment often requires 300 to 1000 lux of illumination. At the same time, excessive contrast in luminance level may cause adverse effects such as glare. Modern lighting control systems seek to maintain the desired lighting environment, while keeping the energy cost of lighting as low as possible.

Many closed-loop lighting control systems employ daylight harvesting techniques to reduce the energy cost of lighting. For such systems, the lights can be adaptively dimmed or switched off based on the available daylight level and other information such as the occupancy. At the same time, these systems also need to adjust the shading to mitigate the adverse effect of excessive daylight like the glare.

For closed-loop lighting control systems, real-time daylight data is important in the decision-making process. Currently, most lighting control systems use luxmeters or cameras to measure the illuminance distribution in the structures. There are a few disadvantages with these sensors. First, the luxmeters or the cameras can only measure a limited area. As a result, many sensors need to be deployed in the space to obtain a detailed estimation of the daylight level. Second, many luxmeters need commissioning in advance to establish the relationship between the sensor readings and the illuminance level in the area of interest. Third, the luxmeters installed on the workbench or the cameras monitoring the workbench may be disturbing for the occupants. Finally, once deployed, these sensors cannot be easily moved without recommissioning.

In an embodiment of the present cyber-physical system, several parallel luminance sensors are deployed at all the glazing units of the structure to measure input light energy from the glazing units. The contribution of each glazing unit on the light distribution inside the structure is calculated in advance and stored as the view matrices, which map the luminance from the glazing units to illuminance distributions in the structure. Each column of the view matrix is the illuminance from a light ray of the unit luminance in a particular direction. When the parallel luminance sensors have obtained the emitted luminance of the glazing units, the data is multiplied with the view matrices and added up to represent the daylight distribution in the room. The result can be used by the lighting control systems in the same way as the readings from the luxmeters.

Compared with the approach based on luxmeters or cameras, the present cyber-physical system can estimate the daylight illuminance at any place in the structure, as the view matrix to that place can always be calculated using raytracing algorithms. Meanwhile, the luminance sensors are only deployed near the glazing units, so they are not intrusive to the occupants. Finally, the commissioning and recommissioning process is also simpler compared with the traditional approach. It only involves raytracing simulations to generate the view matrices.

FIG. 1 shows the system design of a portable cyber-physical system for real-time daylight evaluation in buildings, according to an embodiment of the present invention. The luminance sensor 101 measures the luminance data from the glazing units. The data processing unit 102 receives the luminance from the sensors 101 and calculates the indoor daylight distribution of the structure with the stored view matrix information. The data processing unit 102 can be a simple system-on-chip computer, as the computation load in real time is usually very low. The data processing unit 102 has an interface 103 with the lighting control system 105. Through this interface 103, the daylight illuminance data is sent to the lighting control system 105 for use. A user interface 104 is also included for the occupants to learn about the current illuminance level in the space.

Figure 2:
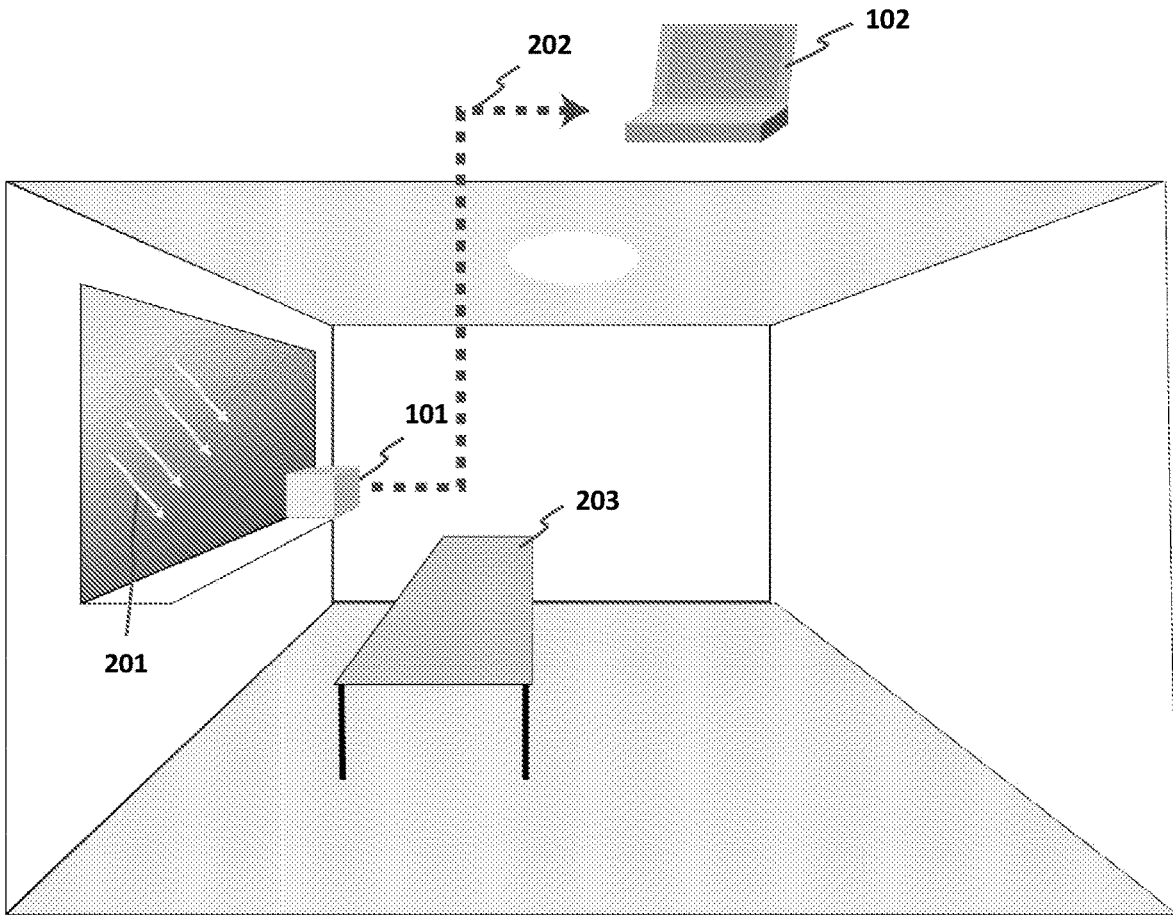
FIG. 2 shows a schematic illustration of a system deployed in buildings, according to an embodiment of the present invention.

FIG. 2 shows an example of the deployment of an embodiment of the present cyber-physical system in a structure. The luminance sensor 101 is placed near the glazing units to measure the incoming daylight 201 passing through the window. This luminance distribution is the input light energy into the structure. The data transmission 202 between the luminance sensor 101 and the data processing unit 102 can be achieved using either cables or wireless solutions. The data processing unit 102 will then calculate the daylight illuminance distribution at the area of interest like the workbench 203 in the office. With these data, the lighting control system will be able to deduce the proper output level of the lights in the room in real time. Because there is no need to install any luxmeters on the workbenches 203, the disturbance to the occupants is minimal.

Figure 3:
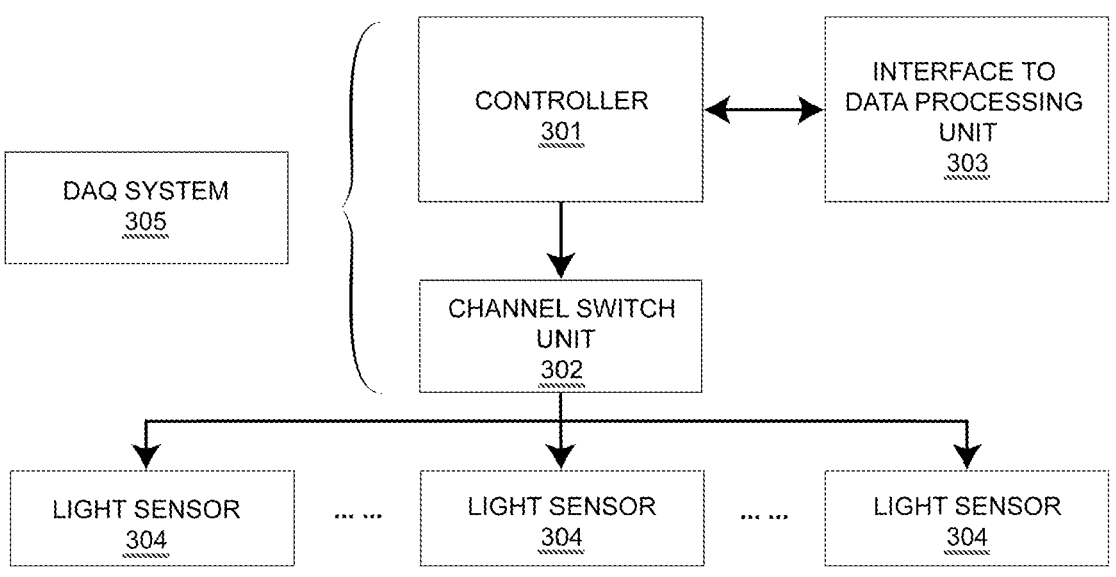
FIG. 3 shows a block diagram of a parallel luminance sensor, according to an embodiment of the present invention.

FIG. 3 shows the system diagram of the parallel luminance sensor 101, which is a core component, according to an embodiment of the present invention. The luminance sensor 101 has three levels. The bottom level has a large number of ambient light sensor chips 304 arranged in a specific pattern. One suitable pattern is the Klems basis pattern, which is widely adopted in the numerical analysis of glazing units. In this case, each ambient light sensor is placed at the center of one Klems basis patch to measure the average illuminance level of this patch. Then, the average luminance within that patch is calculated with predetermined conversion factors. The method to determine these conversion factors is elaborated in the description of FIG. 7 below. The ambient light sensor chips 304 are equipped with filters to match the response curve of human eyes.

Because the number of light sensor chips is large (e.g., 145 for the Klems basis), a channel switch unit 302 is needed to manage the communication between the ambient light sensors 304 and the controller 301. The ambient light sensor chips 304 generally use intra-board communication buses like the I2C to transfer data to the controller 301. The number of sensors that can be connected to the controller 301 is then limited by the address space of the bus. The channel switch unit 302 includes multiplexers to select among all the channels of the ambient light sensors. In this way, the controller 301 can collect data from all sensors 304 in a very short time interval.

In an embodiment, the controller 301 collects readings from all the ambient light sensors 304. It also has an interface with the data processing unit 303 to transfer the luminance data for the illuminance calculation of the structure. The controller 301 and the channel switch unit 302 form the data acquisition (DAQ) system 305 of the luminance sensor.

Figure 4:
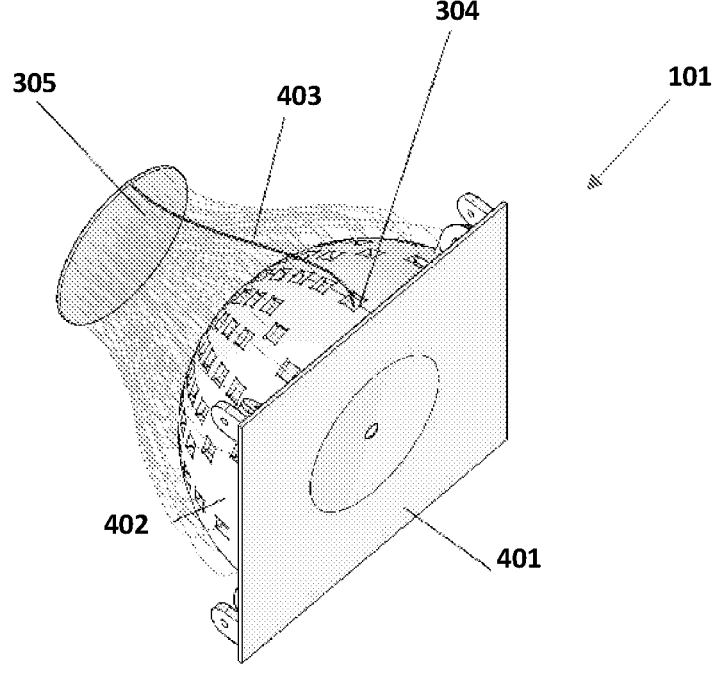
FIG. 4 shows the components of the parallel luminance sensor in the assembled view, according to an embodiment of the present invention.

FIG. 4 shows the assembled view of the luminance sensor 101, according to an embodiment of the present invention. The optical component of the sensor has a front panel 401 and an optical core 402. The ambient light sensors 304 are installed on the optical core 402 in a specific pattern. The ambient light sensors 304 are connected to the DAQ system board 305 through wires 403. The DAQ system board 305 includes the controller and the channel switches.

Figure 5:
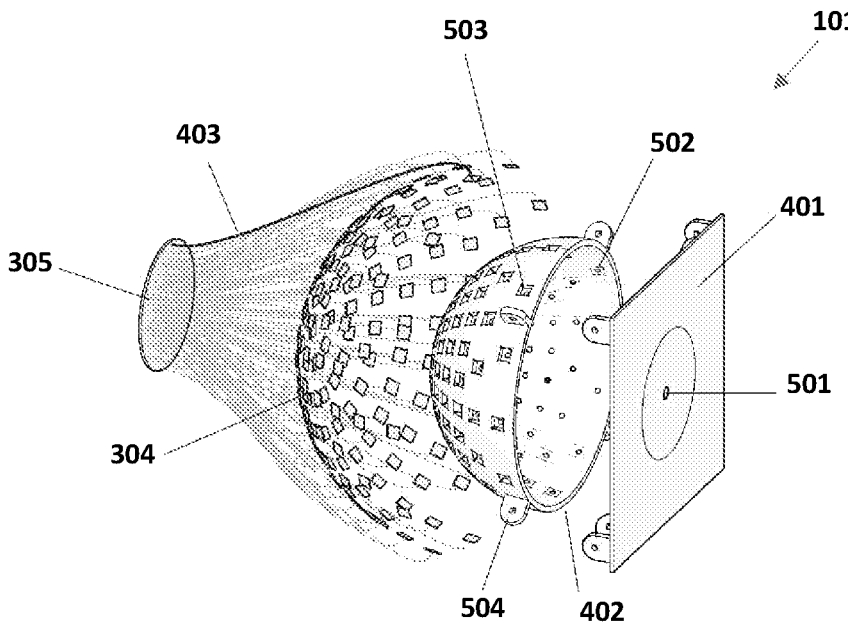
FIG. 5 shows the components of the parallel luminance sensor in the exploded view, according to an embodiment of the present invention.

FIG. 5 shows an exploded view of the luminance sensor 101, according to an embodiment of the present invention. The front panel 401 of the luminance sensor has an aperture 501 at the center. The luminance distribution of the light is sampled through this aperture 501. The diameter of the aperture 501 is $\frac{1}{10}$ of the radius of the optical core 402, so that the aperture 501 can be approximated as a point source to the light sensors 304 in the back. The light sensors 304 are inserted in the sensor slots 503 of the optical core 402. There is a small sensor window 502 at the bottom of each sensor slot 503 for the light sensors to 'see' the aperture 501. The sensor slots 503 and the sensor windows 502 ensure that the light sensors are placed at the center of each Klems basis patch and face exactly the center of the aperture. The internal surfaces of the optical core 402 and the front panel 401 are painted matte black to reduce any unwanted reflections and stray lights. The optical core and the front panel are fixed together through the dowel pin slots 504 at the corners.

Figure 6:
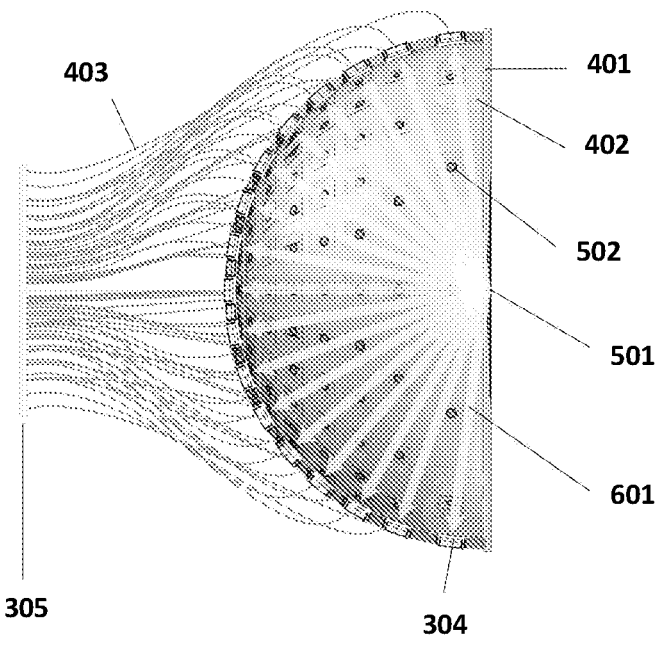
FIG. 6 shows a section diagram of the assembled parallel luminance sensor, according to an embodiment of the present invention.

FIG. 6 shows the section view of the assembled parallel luminance sensor, according to an embodiment of the present invention. The light sensors 304 are placed facing the aperture 501. The size of the aperture 501 and the optical core 402 ensures that one light sensor 304 only measures light from one Klems basis patch. The light rays 601 from the aperture 501 would reach each light sensor 304 right through the sensor windows 502.

Figure 7:
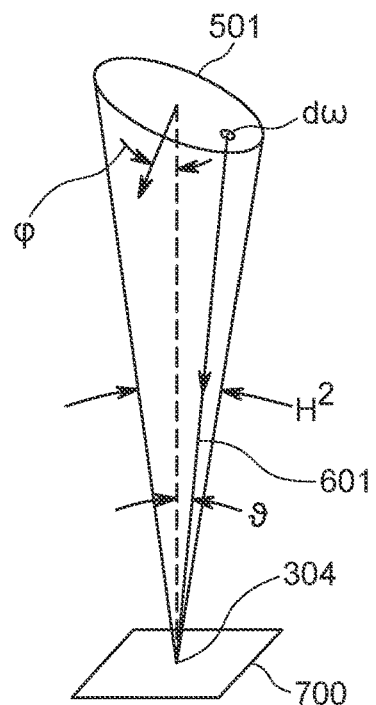
FIG. 7 is an illustration for the derivation of the relationship between the illuminance level at the sensor surface and the luminance in the corresponding direction, according to an embodiment of the present invention.

FIG. 7 shows an illustration of the light propagation between the aperture 501 and the surface of the light sensor 304 within sensor plane 700, according to an embodiment of the present invention. The illuminance level at the surface of the light sensor E is expressed as by equation (1):

$$E = \int_{H^2} L(\omega) \cos \theta(\omega) \, d\omega \qquad (1)$$

where $L(\omega)$ is the luminance from the aperture in the direction of the light sensor; $d\omega$ is the infinitesimal solid angle corresponding to one ray from the aperture having the position defined by $\omega$; $\theta(\omega)$ is the zenith angle of the $d\omega$; and $H^2$ is the total solid angle extended by the aperture, viewed from the sensor. Because the aperture is small, the luminance $L(\omega)$ is approximately constant over $H^2$.

Therefore, the conversion factor between the illuminance reading from the light sensors 304 and the luminance level in the corresponding direction is expressed by equation (2):

$$E/L = \int_{H^2} \cos \theta(\omega) \, d\omega. \qquad (2)$$

The analytical solution of the above integration is not trivial, as the total solid angle extended by the aperture, $H^2$, is not easy to calculate. However, the result can be calculated by numerical methods.

Figure 8:
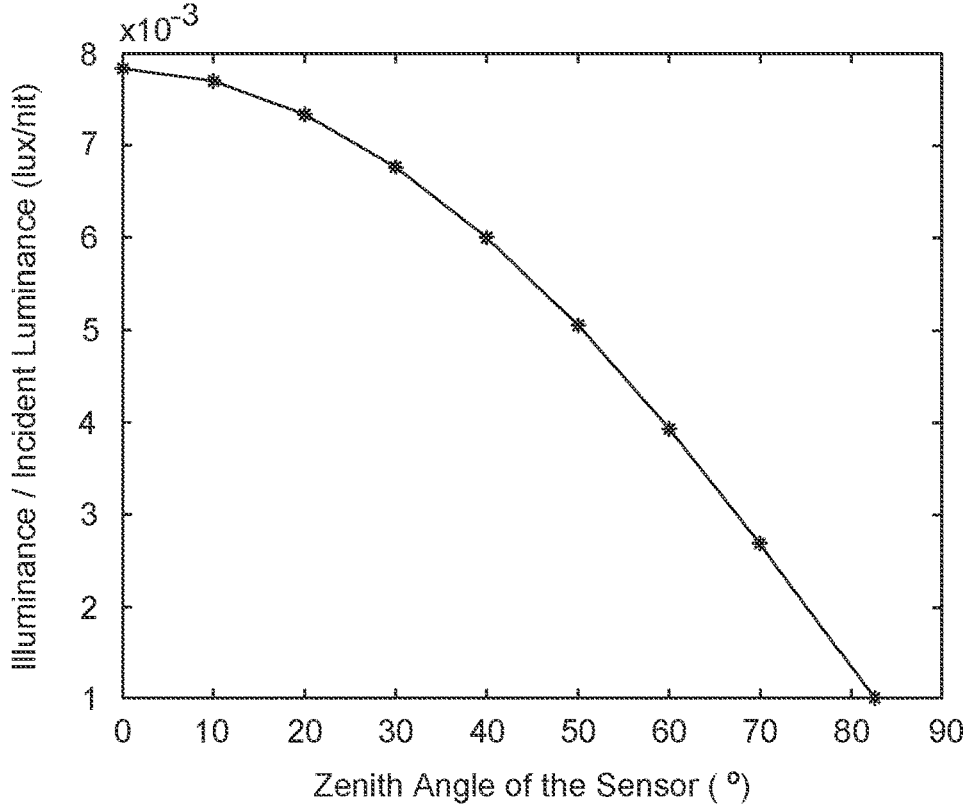
FIG. 8 shows conversion factors between the illuminance level at the sensor surface and the luminance in the corresponding direction, according to an embodiment of the present invention.

FIG. 8 shows conversion factors between the illuminance level at the sensor surface and the luminance in the corresponding direction, according to an embodiment of the present invention. FIG. 8 is a plot of a ratio between the illuminance and the incident luminance versus the zenith angle of the sensor. The ratio decreases with increasing zenith angle. The factors depend on the geometric design of the optical core. Therefore, the factors are calculated for each design of the optical core. Each ring of light sensors (which shares the same zenith angle q as in FIG. 7) shares the same conversion factor. The readings of the light sensors can then be divided by the conversion factors to determine the luminance value in that direction.

Figure 9:
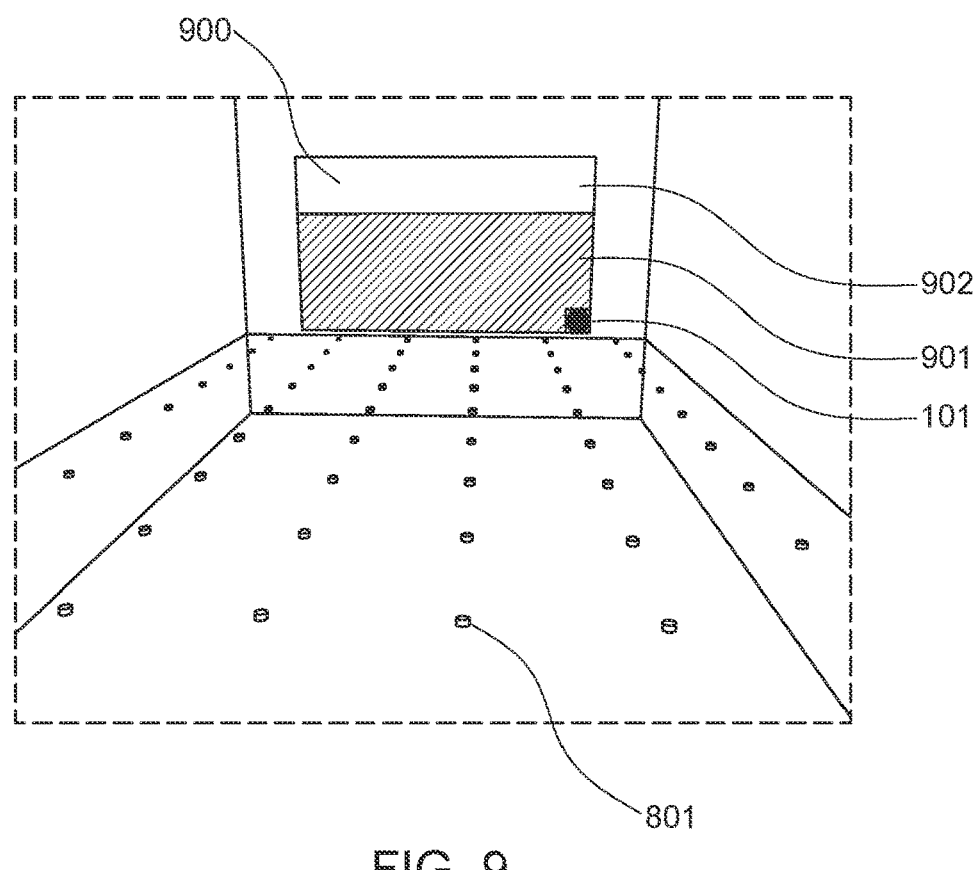
FIG. 9 shows an example case of the system deployed in an office in Berkeley, according to an embodiment of the present invention.

FIG. 9 shows one example of the cyber-physical system deployed in a simulated office room placed in Berkeley, according to an embodiment of the present invention. In an embodiment, the luminance sensor 101 is placed at the corner of the east-facing window 900. Through the window

900, can be seen the external ground 901 (e.g., grass) and the sky 902, as depicted in FIG. 9. The illuminance at a grid of sensor points 801 is calculated based on the readings from the luminance sensor 101. The readings of the luminance sensor 101 itself is simulated with raytracing. In an embodiment, the sky light is set at 7:30 PDT on June 21$^{st}$.

Figure 10:
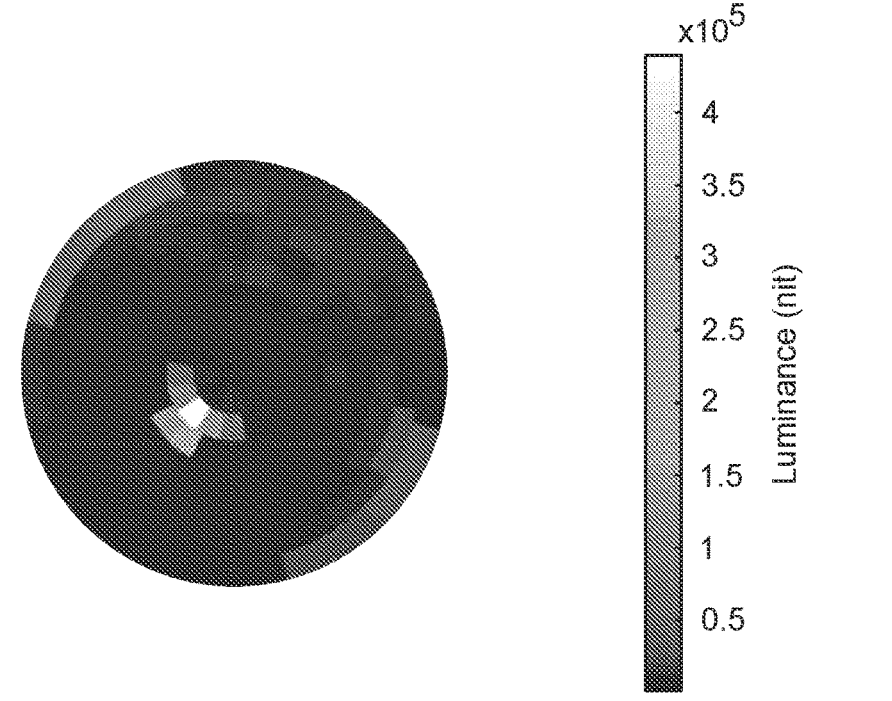
FIG. 10 shows the measured luminance data from the parallel luminance sensor in the example in FIG. 9, according to an embodiment of the present invention.

FIG. 10 shows the luminance readings from the luminance sensor in the scene of FIG. 9, according to an embodiment of the present invention. The patches are in Klems basis. The patches corresponding to the upper northeastern sky have recorded the highest luminance level, which is consistent with the chosen sky condition.

Figures 11, 12:
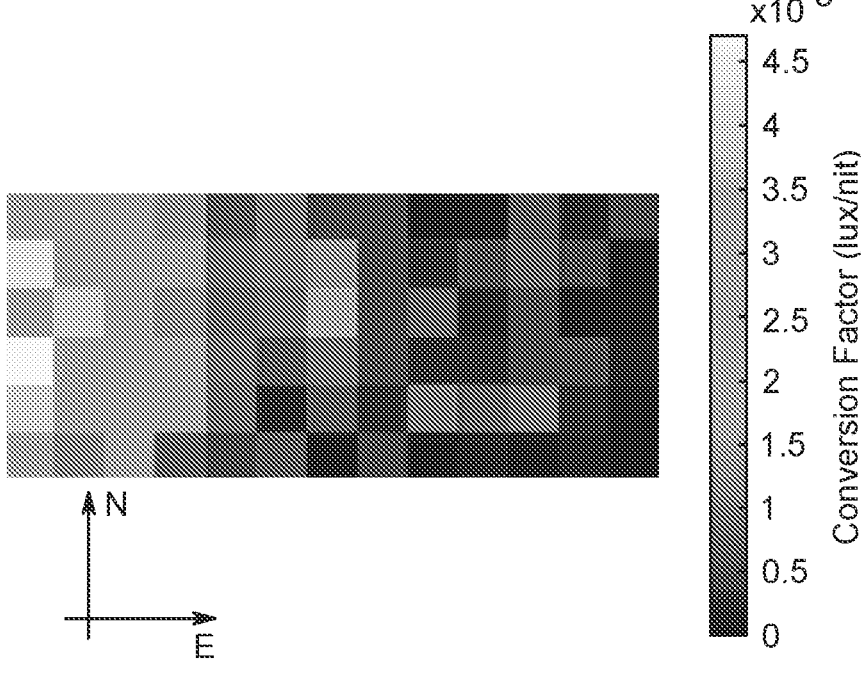
FIG. 11 shows the view matrix corresponding to the central Klem basis patch in FIG. 9, according to an embodiment of the present invention.
FIG. 12 shows the indoor daylight distribution result calculated from the measurement data in FIG. 9, according to an embodiment of the present invention.

FIG. 11 shows the view matrix corresponding to the central patch of the Klems basis, according to an embodiment of the present invention. The view matrices map the luminance within each Klems basis patch to an illuminance distribution in the structure space. Because the central patch corresponds to the horizontal light, the back of the room is the most luminated. The view matrices are multiplied with the luminance readings shown in FIG. 10 to obtain the final illuminance distribution inside the room.

FIG. 12 shows the resulting illuminance distribution inside the room, according to an embodiment of the present invention. The illuminance distribution realistically reflects the real daylight conditions inside the room. Even though only one sensor is deployed, the illuminance distribution inside the whole room is captured.

Figure 13:
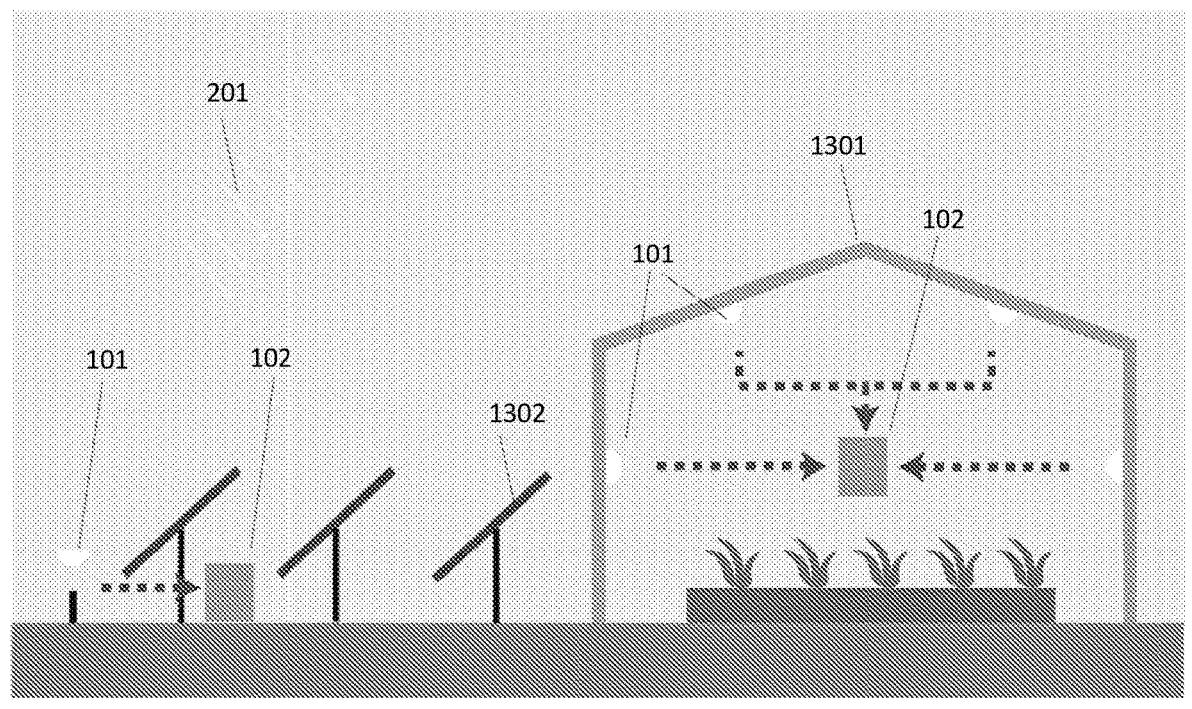
FIG. 13 shows additional application scenarios of the system in agriculture and solar farms, according to an embodiment of the present invention.

FIG. 13 shows some of the additional application scenarios of the system beyond daylight evaluation in buildings, according to an embodiment of the present invention. The left side shows the system deployed in solar farms as a solar tracking device. The parallel luminance sensor(s) 101 determines the luminance 201 distribution from the sky. The control system of the solar tracker then orients the solar panels 1302 to the optimal direction. The right shows the system deployed in greenhouses 1301 to monitor daylight distribution. As in the case of buildings, the luminance sensors 101 are deployed in different areas of the façade of the greenhouse 1301 or different locations in a solar farm to measure the incoming solar radiance. The data processing unit 102 receives the luminance from the luminance sensor (s) 101 and calculates the indoor daylight distribution of the structure with the stored view matrix information. The resulting irradiance distribution is calculated in the same way as presented in FIG. 1. The irradiance data can be used for example to predict the growth of the crop in agrophotovoltaic applications.

While various embodiments of the present invention have been described above, it should be understood that they have been presented by way of example only, and not limitation. Thus, the breadth and scope of the present invention should not be limited by any of the above-described illustrative embodiments, or following examples, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments, and following examples, may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A luminous-distribution sensor, comprising:

a front panel defining an aperture therethrough;

an optical core having a concave surface and arranged behind said front panel so that light that passes through said aperture would impinge upon said concave surface; and a plurality of light-sensing elements distributed across said concave surface, wherein said plurality of light-sensing elements provide intensity and direction of light along a corresponding plurality of light-ray paths to provide a measured luminous distribution.

2. The luminous-distribution sensor according to claim 1, wherein said concave surface is a semi-spherical surface.

3. The luminous-distribution sensor according to claim 2, wherein said plurality of light-sensing elements are arranged in a pattern across said concave surface corresponding to a Klems basis.

\* \* \* \* \*